J. S. COPELAND.
COUPLING.
APPLICATION FILED JULY 31, 1917. RENEWED OCT. 16, 1918.
1,286,238.
Patented Dec. 3, 1918.
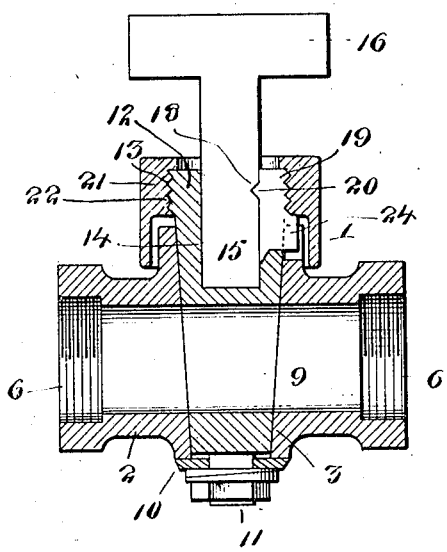
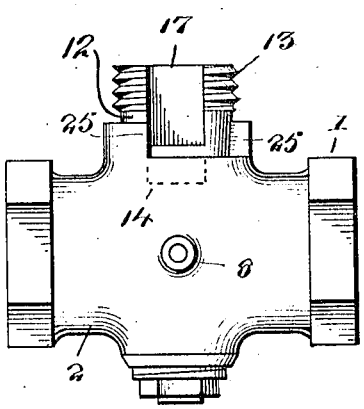
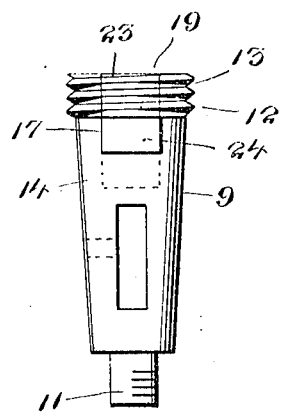
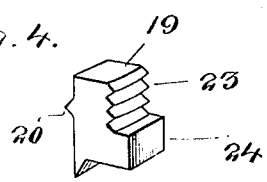
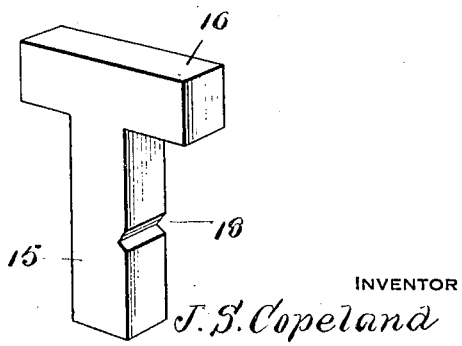
WITNESSES
E. P. Ruppert.
D. B. Phillips.
INVENTOR
J. S. Copeland
BY Victor J. Evans
ATTORNEY

UNITED STATES PATENT OFFICE.

JOE S. COPELAND, OF VAN ALSTYNE, TEXAS.

COUPLING.

1,286,238. Specification of Letters Patent. Patented Dec. 3, 1918.

Application filed July 31, 1917, Serial No. 183,743. Renewed October 16, 1918. Serial No. 258,390.

*To all whom it may concern:*

Be it known that I, JOE S. COPELAND, a citizen of the United States, residing at Van Alstyne, in the county of Grayson and State of Texas, have invented new and useful Improvements in Couplings, of which the following is a specification.

This invention relates to improvements in couplings for detachable handles of stop and drain-cocks and the like.

The principal object of the invention is the provision of a coupling having a detachable key member and a locking means for securing the key member to the valve plug and handle to more effectually lock the plug and handle together while at the same time permitting the handle to be readily removed for the substitution of a handle of different length or for any other purpose as desired.

Another object is to provide an extension on the key member for coöperating with the stops of the valve casing to limit the valve plug to movements to certain positions in the operative position of the key member.

To effect these ends and such others as may hereinafter appear I have embodied the invention in the preferred form described in the specification below, and illustrated in the drawings, and I have broadly set forth the novel features of the invention in the appended claims.

In the drawings:—

Figure 1 represents a longitudinal section through the valve.

Fig. 2 is a side elevation of the valve with the locking collar and handle removed.

Fig. 3 is a side elevation showing the valve plug in detail.

Fig. 4 is a detail perspective view of the key member.

Fig. 5 is a perspective view showing the handle in detail.

In the drawings the valve as a whole is indicated by the numeral 1. It has the usual hollow casing 2 formed with the customary tapered bore 3, the portions of the casing 2 adjacent the bore 3 constituting the valve seat. The usual screw threaded openings 6 for connection with pipes are provided toward opposite ends of the casing 2. The valve shown is of the type which when the plug is turned to a certain position obstructs the flow of fluid through the pipes connected to the valve and permits the fluid to drain from one of the pipes through a drain opening 8 provided in the side of the valve.

A valve plug 9 is provided for the valve. Those portions of the plug which are disposed within the casing 2 for engagement with the seat of the casing are of the usual construction, and the plug may be retained in the casing by the usual collar 10 screw threaded on a projection 11 of the small end of the plug.

In accordance with the invention the other end of the plug 9 projects beyond the casing, the projecting portion 12 being cylindrical in form and provided on the periphery with screw threads 13. The projecting portion 12 is formed in the end with a recess 14, preferably polygonal, for receiving the similarly shaped end 15 of the valve handle 16. The cylindrical portion 12 is further provided toward the end outward from the recess with a longitudinal slot 17. The end 15 of the handle has on one side a notch or depression 18 adapted to coincide in position with the slot 17 when the handle is inserted in the plug. To retain the handle in the plug a key member 19 is adapted to loosely fit into the slot 17 and has a projection 20 for engaging in the notch 18. The outer portion of the member 19 is provided with interrupted screw threads 23 arranged to coincide with the screw threads 13 adjacent the slot 17. A collar 21 formed with internal screw threads 22 for engaging with the screw threads 20 and 13 on the key member and the plug respectively, constitutes a means for securely locking the key member to the plug and handle to retain the latter in connection with the plug.

Preferably the key member 19 is adapted to limit the movement of the valve plug to a desired degree when in position. For this purpose the casing 2 may be of the type having stop shoulders 25 adjacent the large end of the bore 3. In this case the key member 19 is provided on the inner end with an extension 24 which when the key member is locked in position will engage against the shoulders 25 at either limit of travel of the plug.

It will be seen that by the above described structure the handle may readily be removed and replaced and a handle of different length substituted if desired. It will also be seen that the key member when secured in position serves by engagement with the shoulders 25 to limit the rotary movement of the valve plug. These limiting shoulders may obviously be placed in any desired location, and such shoulders, if desired, may be formed upon each side of the valve casing thereby enabling the position of the plug to be changed or reversed.

The form of the invention which I have shown and described is considered preferable but constitutes only one of many included in the spirit and scope of the invention, and the right is reserved to changes, alterations and departures from the specific structure shown falling within the latitude of the claims.

What is claimed is:

1. The combination with a valve casing having stops, of a valve plug mounted in the casing and having means whereby it is adapted for detachable engagement with an extension element, an extension element for the plug, means for locking said extension element to the plug, and means on said locking means for engaging against the stops of the valve casing to limit the movement of the plug in the operative position of the locking means.

2. The combination with a valve casing, of a valve plug mounted in the casing and having means whereby it is adapted for detachable engagement with an extension element, an extension element for the plug, a key member having means whereby it is adapted for detachably engaging with the plug and extension element, and means for locking said key member to the plug to retain said extension element in engagement with the plug.

3. The combination with a valve casing having stops, of a valve plug mounted in the casing and having means whereby it is adapted for detachable engagement with an extension element, an extension element for the plug, a key member having means whereby it is adapted for detachably engaging with the plug and extension element, means for locking said key member to the plug to retain said extension element in engagement with the plug, and means on said key member adapted to engage against the stops of the valve casing in the operative position of said member to limit the movement of the plug.

4. In a coupling, a plug having a cylindrical screw threaded portion formed in one end with a recess and toward said end with a longitudinal slot, an extension element having a portion disposed in said recess and formed in said portion with a depression adjacent said slot, a key member in said slot, said member having a projection adapted to engage in said depression, said member further having a portion provided with interrupted screw threads coacting with the screw threads on said plug, and a collar provided with internal screw threads adapted to engage with the threads on said plug and key member to lock said member to said plug and extension element.

In testimony whereof I affix my signature.

JOE S. COPELAND.

Copies of this patent may be obtained for five cents each, by addressing the "Commissioner of Patents, Washington, D. C."